United States Patent [19]

Alexion et al.

[11] 4,132,604
[45] Jan. 2, 1979

[54] REFLUX RETURN SYSTEM

[75] Inventors: Dennis G. Alexion, Sarnia, Canada; Fredrick P. Storm, Jr., Morris Plains, N.J.

[73] Assignee: Exxon Research & Engineering Co., Florham Park, N.J.

[21] Appl. No.: 715,970

[22] Filed: Aug. 20, 1976

[51] Int. Cl.² ............................ B01D 3/26; B01D 7/00
[52] U.S. Cl. ................................. 203/87; 261/114 R; 203/90; 62/12
[58] Field of Search ........................ 203/87, 90, 98, 95, 203/97; 202/236, 158; 196/98; 165/105; 261/114 R; 62/12, 28, 32

[56] References Cited

U.S. PATENT DOCUMENTS

| | | | |
|---|---|---|---|
| 1,993,886 | 3/1935 | Jaeger et al. | 203/90 |
| 3,024,171 | 3/1962 | Bone, Jr. | 203/7 |
| 3,032,478 | 5/1962 | Bethea et al. | 203/98 |
| 3,531,376 | 9/1970 | Minoda et al. | 203/98 |
| 3,682,779 | 8/1972 | Ritter | 203/90 |
| 3,742,016 | 6/1973 | Iida | 203/87 |

Primary Examiner—Hiram H. Bernstein
Attorney, Agent, or Firm—Yale S. Finkle

[57] ABSTRACT

The temperature of the reflux fed to a fractionating tower is increased after the reflux enters the tower and before it passes onto the reflux return tray by passing the reflux through an atomizer in the fractionating tower above the reflux return tray to produce a downfalling spray of liquid droplets; collecting the droplets on a reflux pan located between the atomizer and the reflux return tray, the reflux pan being designed to allow the passage of hot vapors rising from the reflux return tray; and passing the collected liquid from the reflux pan onto the reflux return tray. The distance between the reflux pan and the atomizer is such as to allow the downfalling droplets to absorb sufficient heat from the hot rising vapors so that the temperature of the reflux liquid collected on the reflux pan is increased to a desired value. The distance between the atomizing device and the reflux pan necessary to raise the temperature of the reflux to the desired value may be minimized by using a two-condenser, two-drum fractionator overhead system to increase the temperature of the reflux before it is fed to the fractionator.

4 Claims, 1 Drawing Figure

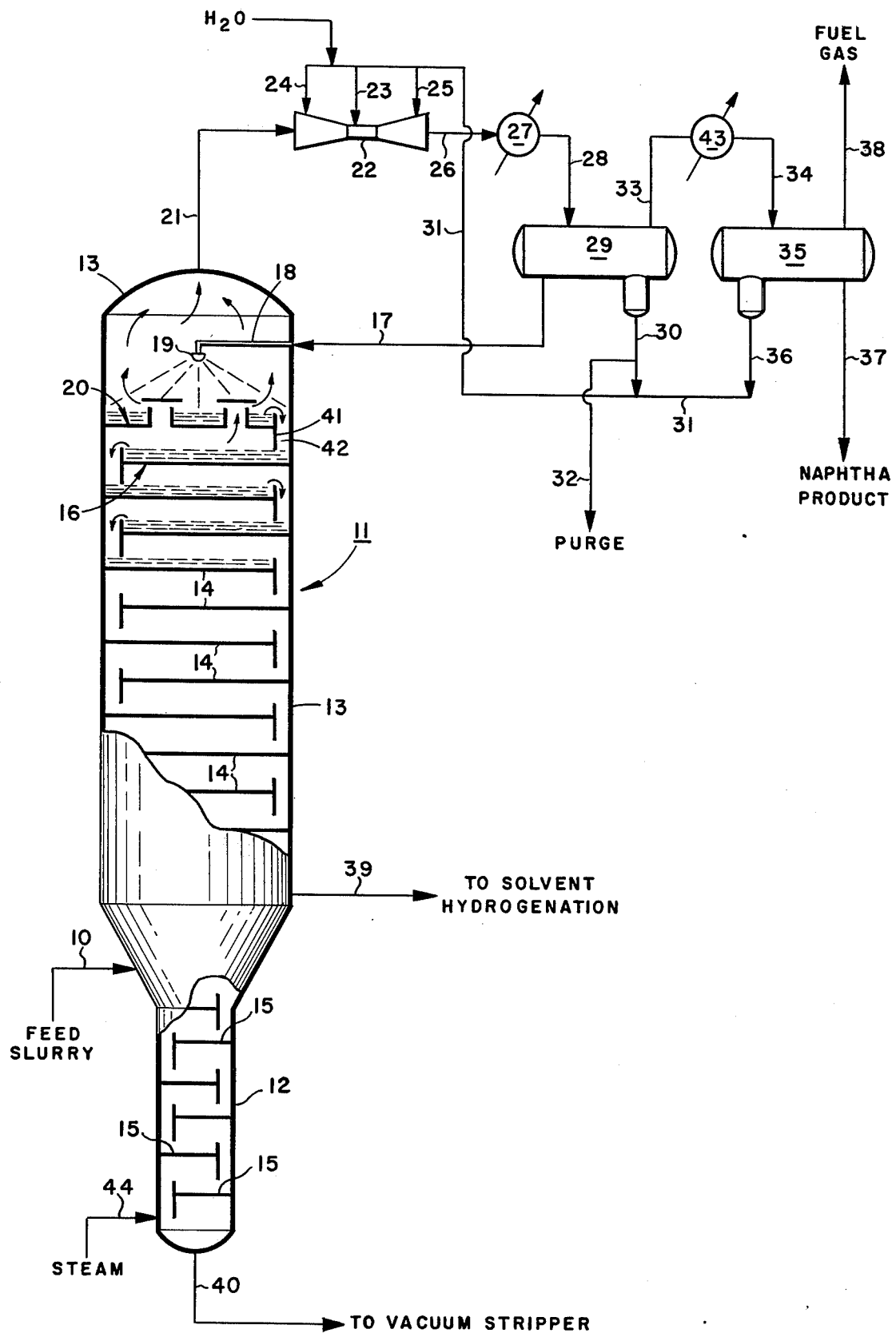

REFLUX RETURN SYSTEM

BACKGROUND OF THE INVENTION

1. Field of the Invention

This invention relates to the return of reflux to a fractionating tower and is particularly concerned with a reflux return system for internally increasing the temperature of the reflux.

2. Description of the Prior Art

Distillation is the separation of the constituents of a liquid mixture by the partial vaporization of the mixture and separate recovery of the vapor and residue. A distillation carried out in such a manner that the vapor rising from a still comes in contact with a condensed portion of vapor previously evolved from the same still is called rectification. During rectification a transfer of material and interchange of heat result between the vapor and condensate, thereby producing a greater concentration of the more volatile components in the vapor than could otherwise be obtained with a single distillation operation using the same amount of heat. The condensed vapors returned to the rectification column are called reflux. Fractionation is a term synonymous with rectification and is commonly used to describe rectification carried out in the refining and petrochemical industries.

In a typical fractionation facility the overhead vapors from a fractionating tower are passed through a heat exchanger or condenser where they are condensed to form a liquid product, which is then passed to an overhead collection drum. The temperature of the liquid product collected in the overhead drum is normally well below the tower top temperature. A portion of this liquid product is returned to the column as reflux, normally by pumping it directly onto the reflux return tray. The sudden mixing of the cool reflux with the hotter liquid on the tray causes the temperature on that portion of the tray nearest the reflux inlet to drop rapidly.

For the purpose of heat economy it has been a common practice in the past to use a two-condenser, two-drum overhead system in lieu of a one-condenser, one-drum system in which the vapors are condensed, the resultant liquid is cooled to a relatively low temperature, and the liquid is collected in a single drum from which the reflux and product distillate are withdrawn. In the two-condenser, two-drum system, the overhead vapors from the fractionating tower are partially condensed in the first condenser and the resultant liquid is collected in the first drum at a temperature intermediate between the tower top temperature and the temperature of the product distillate. This liquid, which is at a temperature higher than could be obtained in a one-condenser, one-drum system, is then returned to the column as reflux. The remaining vapors in the first drum are passed through a second condenser where they are further cooled and condensed to form the distillate product, which is then collected in the second drum. In certain cases more than two condensers and drums have been used in fractionator overhead systems.

Although the use of a two-condenser, two-drum overhead system will allow the return of reflux to the fractionating tower at a higher temperature than can ordinarily be obtained using a one-condenser, one-drum system, the reflux will still be at a temperature significantly lower than that of the liquid on the reflux return tray and therefore the mixing of the reflux with the hot liquid on the tray will result in cool spots and a sudden decrease of temperature on or near the tray. In many instances this cooling will have little adverse effect on the operation of the fractionating tower. There may, however, be situations where a sudden drop and maldistribution of temperature on or near the reflux return tray will be deleterious to the fractionation process. Such will be the case if one of the components of the vapor is a substance that desublimes to form a solid when the temperature on or near the reflux return tray drops below a certain value. A gradual buildup of solid material will plug the reflux return tray, decrease the efficiency of the fractionation and eventually force the shutdown of the fractionating tower. To insure that the temperature on the reflux return tray does not fall below the desublimation temperature, it may be necessary that the temperature of the cool reflux be substantially increased before it is passed onto the reflux return tray in the fractionating tower.

SUMMARY OF THE INVENTION

This invention provides an improved method and apparatus for returning a reflux stream to a reflux return tray in a fractionating tower. In accordance with the invention, it has now been found that the temperature of the reflux may be substantially increased after the reflux enters the tower and before it passes onto the reflux return tray by passing the reflux through an atomizer in the fractionating tower above the reflux return tray to produce a downfalling spray of liquid droplets; collecting the droplets on a reflux pan located between the atomizer and the reflux return tray, the reflux pan being designed to allow the passage of hot vapors rising from the reflux return tray; and passing the collected liquid from the reflux pan onto the reflux return tray.

The distance between the reflux pan and the atomizer is such as to allow the downfalling droplets to absorb sufficient heat from the vapors passing upward through the reflux pan so that the temperature of the reflux liquid collected on the reflux pan is increased to a desired value. Normally, it is desirable to raise the reflux temperature to a particular value in an effort to avoid operating problems that might otherwise occur. For example, if a compound that undergoes desublimation is present in the vapor phase in the fractionator, it may be desirable to increase the reflux temperature to a value above the desublimation temperature thereby avoiding the formation of solids that may plug the reflux return tray. Similarly, if water vapor is present in the vapor phase in the fractionator, it may be advantageous to increase the reflux temperature to a value that will insure that the reflux will not cause water to condense out of the vapor phase and collect on the reflux return tray where it may cause corrosion problems.

The distance between the atomizer and the reflux pan necessary to raise the temperature of the reflux to the desired value may be minimized by using a two-condenser, two-drum overhead system to increase the temperature of the reflux before it is fed to the fractionator. In such a system only a portion of the heat in the overhead vapors is removed as they pass through the first condenser. Thus the liquid effluent or relux from this condenser will have a temperature higher than can ordinarily be obtained using a one-condenser, one-drum system. The remaining vapors are then condensed in a second condenser to form a much cooler distillate product.

BRIEF DESCRIPTION OF THE DRAWING

The single FIGURE in the drawing is a schematic flow sheet of an atmospheric distillation system operated and designed in accordance with the invention.

DESCRIPTION OF THE PREFERRED EMBODIMENT

The distillation column 11 and its overhead equipment depicted in the drawing form a system for the atmospheric distillation of the effluent from a hydrogen-donor coal liquefaction reactor to produce an off gas, an overhead distillate of naphtha quality, a sidestream of solvent quality and a solids-containing bottoms. The distillation system shown in the drawing is one part of an overall processing scheme for producing a hydrogenated liquid product from coal by treating the coal with a hydrogen-containing gas in the presence of a hydrogen-donor solvent. It will be understood that the invention is not restricted to the particular distillation system shown in the drawing or to the use of such a system in a coal liquefaction processing plant, but can be used in conjunction with other types of distillation systems in any type of processing scheme in which it is desirable to increase the temperature of a reflux stream after it has been returned to the fractionating section of a distillation column and before it is passed onto a reflux return tray.

Distillation column 11 shown in the drawing is comprised of stripping section 12 and fractionating tower 13. The fractionating tower contains a series of trays, generally designated by reference number 14, the first of which is located directly above the point at which the feed is injected through line 10 into the distillation column. The trays will normally be sieve trays but may be any other type of standard fractionating trays that are operable in the system. The number of trays will depend in part upon the composition of the feed and the composition of the products desired from the fractionation.

The fractionating tower is designed to produce two main product cuts, an overhead naphtha quality cut having a boiling range above about 400° F. and a sidestream of solvent quality having a boiling range between about 400° F. and about 700° F. The naphtha quality stream is removed in vapor form overhead from the fractioating tower through line 21. The vapors are then passed through an overhead system comprising wet scrubber 22, condenser 27, reflux drum 29, condenser 43, and distillate drum 35 to form a liquid distillate product of naphtha quality. The design and operation of the overhead system is described in detail hereafter. The liquid solvent stream is withdrawn through line 39 off one of the trays near the bottom of fractionating tower 13. The solvent is then passed to downstream units where it undergoes catalytic hydrogenation to form a hydrogen-donor solvent, which is purified and at least in part recycled to the liquefaction reactor.

The feed to column 11 will normally be a slurry that originates from a coal liquefaction reactor or a series of liquefaction reactors upstream of the distillation column. The feed slurry will normally be composed of unconverted coal or similar carbonaceous solids and mineral matter suspended in an oil composed of many diverse types of hydrocarbons. Usually, the feed slurry will contain gaseous hydrogen chloride and ammonia formed during the liquefaction process from chlorine and nitrogen-containing compounds present in the coal fed to the upstream reactor.

It is generally desirable to utilize sieve trays, designated in the drawing by reference number 15, in stripping section 12 of the distillation column. The liquid entering the stripping section will normally contain between about 19 and about 28 weight percent solids. The presence of solids in these concentrations may make it unfeasible to use sieve trays because of plugging problems that may be encountered. It may, therefore, be necessary to utilize side-to-side baffles or similar devices in lieu of the sieve trays. Steam is injected into the distillation column through line 44 below the bottom tray and rises through the descending liquid and solids, stripping out the lower boiling hydrocarbons. These hydrocarbons then pass in vapor form upward into the bottom of fractionating tower 13. The solids-containing bottoms is removed from the stripping section via line 40 and passed to a vacuum stripper or similar device for further processing.

As previously mentioned, ammonia and hydrogen chloride are normally formed in the liquefaction reactor and will therefore be present in the feed to distillation column 11. The actual concentration of the hydrogen chloride and ammonia present in the feed will depend in part upon the concentration of the coal fed to the liquefaction reactor. Because of the presence of gaseous hydrogen chloride and ammonia in the distillation column, it is necessary to insure that the temperature in the column does not fall below the temperature at which solid ammonium chloride desublimes to plug the column internals and thereby interfere with the distillation process. "Desublimation" as used herein refers to the direct formation of a solid compound from the gaseous phase without any noticeable formation of an intermediate liquid phase. "Sublimation" is the opposite of desublimation and is used herein to refer to the transformation of a solid compound directly to the vapor phase.

The vapor resulting from the sublimation of ammonium chloride does not consist of molecular ammonium chloride, but mainly of equal volumes of ammonia and hydrogen chloride. Thus, when ammonium chloride sublimes, it dissociates to form ammonia and hydrogen chloride as shown by the following equation:

$$NH_4Cl_{(s)} \rightleftharpoons NH_{3(g)} + HCl_{(g)} \tag{1}$$

Because ammonium chloride is a pure solid, its dissociation constant may be defined as follows:

$$K_d = (\bar{p}_{HCl})(\bar{p}_{NH_3}) = \left[\frac{P_{NH_4Cl}}{2}\right]^2 \tag{2}$$

where $K_d$ is the dissociation constant, p represents partial pressure and $P_{NH_4Cl}$ is the vapor pressure of ammonium chloride. As can be seen from equation (2) above, the value of $K_d$ at any given temperature can be calculated from the vapor pressure of ammonium chloride at that temperature. Vapor pressures of ammonium chloride at various temperatures are widely reported in the literature.

Since, as can also be seen from equation (2) above, $K_d$ will equal the product of the partial pressures of ammonia and hydrogen chloride, $K_d$ may be calculated at any stage in the distillation column from the equilibrium data for that stage. If the product of the partial pressures above any stage is greater than $K_d$ for the temperature at that stage, then ammonium chloride will begin to desublime since the equilibrium represented by equation (1) above will have shifted to the left. Thus, to prevent desublimation, all stages in the distillation column should normally be operated at a temperature such that the product of the partial pressures is less than $K_D$. This may be accomplished by maintaining the temperature of each stage in the column above the desublimation temperature or the temperature at which the product of the partial pressures of ammonia and hydrogen chloride equals $K_D$.

Even though distillation column 11 is designed and operated such that the temperature of all the stages is above the desublimation temperature of ammonium chloride, problems may arise when cool reflux is returned to the column. It has been general practice in the past to inject the reflux through a pipe directly onto the reflux return tray. This procedure cannot effectively be used in the distillation column shown in the drawing since the cool reflux will most likely cause the temperature of the liquid on the reflux return tray to fall below the ammonium chloride desublimation temperature, which will result in the formation of solid ammonium chloride. Further, any reflux that splashes on the column walls as it is injected into the tower may produce localized cool spots that will result in formation of ammonium chloride. Continued operation of the fractionating tower in this manner will result in the plugging of the reflux return tray with solids, a decrease in the efficiency of the fractionation and the eventual shut down of the distillation column. To avoid these problems, it is necessary to return the cool reflux to the fractionating tower in such a manner that its temperature is raised above the desublimation temperature of ammonium chloride before the reflux is passed onto the reflux return tray.

It has been found that the temperature of a reflux stream fed to a fractionating tower may be substantially increased after the reflux enters the tower and before it passes onto the reflux return tray by passing the reflux through an atomizer in the fractionating tower above the reflux return tray to produce a downfalling spray of liquid droplets; collecting the droplets on a reflux pan located between the atomizer and the reflux return tray, the reflux pan being designed to allow the passage of hot vapors rising from the reflux return tray; and passing the collected liquid from the reflux pan onto the reflux return tray. The distance between the reflux pan and the atomizer is adjusted to allow the downfalling droplets to absorb sufficient heat from the vapors passing upward through the reflux pan so that the temperature of the reflux liquid collected on the reflux pan is increased to a desired value. In the distillation system shown in the drawing, the formation of solid ammonium chloride and resultant plugging problems may be avoided by setting this distance so that the temperature of the collected reflux is greater than the desublimation temperature of ammonium chloride.

Referring again to the drawing, liquid reflux, whose formation will be described in detail hereafter, is returned to fractionating tower 13 via line 17. The reflux is injected into the tower through conduit 18, which is attached to downwardly directed atomizer 19. The atomizer converts the reflux into tiny droplets of liquid and propels them outwardly and downwardly over the cross-section of the fractionating tower. The atomizer may be any type of conventional spray nozzle or similar device designed to produce small droplets. Suitable spray nozzles are described in the literature and will therefore be familiar to those skilled in the art. It may be advisable to utilize a spare spray nozzle in case the cool reflux causes the operating one to become plugged with ammonium chloride deposits. Once the reflux flow to the plugged nozzle is terminated, the hot rising vapors will unplug the nozzle by causing the ammonium chloride to sublime.

The liquid droplets are collected on reflux pan 20, which is located between the atomizer and reflux return tray 16. The reflux pan may be any type of tray or similar device that will collect the liquid droplets, pass them as a stream of liquid onto the reflux return tray below, and allow the passage of hot vapors rising from the reflux return tray so that the vapors may contact the cool droplets of liquid falling from the atomizer onto the reflux pan. A chimney tray is one example of a device that may be used as a reflux pan. Such a tray consists of a flat, solid piece of metal connected to a standard downcomer and containing chimneys or vertically hollow structures that convey the vapors upward through the tray. Reflux pan 20 shown in the drawing is an example of a typical chimney tray.

As the droplets of reflux from atomizer 19 fall in contact with the vapors rising from reflux return tray 16 through the chimneys on reflux pan 20, heat is transferred from the hot vapors to the cool droplets. The distance between the reflux pan and the atomizer is of such a magnitude as to allow sufficient time for the droplets to absorb enough heat from the vapors so that the temperature of the liquid collected on the reflux pan is greater than the ammonium chloride desublimation temperature. In general it is desirable that the temperature be between about 10° F. and about 40° F., preferably about 25° F., above the desublimation temperature. Among the variables that will enter into the calculations for determining this distance are the temperature of the reflux passed to the fractionator, the size of the droplets produced by the atomizer, and the temperature of the vapors. The pertinent variables and calculations are similar to those shown in the literature as being associated with the design of spray chambers and will therefore be familiar to those skilled in the art.

The falling droplets of reflux collect on pan 20 to form a column of liquid equal in height to that of weir 41. The excess liquid overflows the weir and passes through downcomer 42 onto reflux tray 16 where it mixes with the liquid on the tray. Since the temperatures of the two liquids are both above the ammonium chloride desublimation temperature, cool spots on or near the tray will not result in the formation of solid ammonium chloride.

The rising vapors are withdrawn from fractionating tower 13 through line 21 and subsequently cooled and condensed. Once these vapors are cooled below the desublimation temperature, solid ammonium chloride will form and if not removed will plug the overhead equipment. To help prevent plugging, it is desirable to dissolve the ammonium chloride in water as soon as it forms. This may be effectively accomplished by simultaneously saturating and scrubbing the overhead vapors with water in an inline, direct contact scrubbing device such as a venturi tube, an atomizing spray nozzle or the like before the vapors are passed to the first condenser.

Referring again to the drawing, the vapors in line 21 are passed into wet scrubber or similar device 22 where they are partially saturated and scrubbed with water injected via line 23 into the throat of the scrubber. The design of the scrubber is similar to that of a venturi tube. This design enables the attainment of over 99.5 percent saturation of the vapors in the throat of the scrubber. The water injected into the throat is atomized into droplets having a mean diameter of about 100 microns by the shearing action of the vapors that have been accelerated to a high velocity in the venturi tube. These small drops provide a large surface area for heat transfer and therefore the water easily evaporates as it removes heat from the overhead vapors. The water in excess of that amount required to saturate the gas dissolves the ammonium chloride that forms as the gas is cooled in the scrubber. Water is also injected into the wet scrubber above and below the throat via lines 24 and 25. This excess water insures a completely wet system and will dissolve any additional ammonium chloride that may form.

The effluent from wet scrubber 22 is passed through line 26 into condenser 27 where the vapors are cooled and partially condensed. As the vapors are cooled any ammonium chloride that forms will dissolve in condensing water. The vapors and liquids exiting condenser 27 are passed through line 28 into reflux drum 29 where the heavier water is allowed to separate from the lighter hydrocarbon oil by phase settling. The water is removed from the drum via line 30 and recycled through lines 31, 23, 24 and 25 to wet scrubber 22. To avoid the buildup of ammonium chloride in the overhead system of distillation column 11, a portion of the water containing the salt is normally purged through line 32. The hydrocarbon oil in reflux drum 29 is withdrawn through line 17 and returned to fractionating tower 13 as liquid reflux in the manner previously described herein.

By utilizing a two-condenser, two-drum overhead system, the temperature of the liquid reflux may be increased to a value substantially higher than can be obtained in a one-condenser, one-drum system. This is accomplished by removing only a portion of the heat in the vapors as they pass through the first condenser. Thus, the liquid effluent from this condenser will have a temperature higher than normal and may be used as reflux. The remaining vapors are then condensed in the second condenser to form a much cooler distillate product. By producing a hotter reflux, the distance between atomizer 19 and reflux pan 20 needed to raise the reflux temperature to the desired value may be decreased. In general, the temperature of the reflux should be maintained as high as possible in order to minimize the distance between the atomizer and the reflux pan.

The gaseous phase in drum 29, which contains hydrocarbon vapors and steam, is passed through line 33 to final condenser 43. Here the vapors are cooled to such a temperature that maximum recovery of distillate liquids may be obtained. As is the case in condenser 27, any ammonium chloride that forms during cooling will dissolve in condensing water. The effluent from the condenser is then passed through line 34 into distillate drum 35 where water is allowed to separate from the hydrocarbon distillate by phase settling. The water, which contains dissolved ammonium chloride, is removed from distillate drum 35 via line 36 and recycled through lines 31, 23, 24 and 25 to wet scrubber 22. The hydrocarbon oil distillate is a naphtha quality product and is removed from distillate drum 35 via line 37 and passed to downstream units for further processing or sent to storage. The vapors that are not condensed in condenser 43 are withdrawn from distillate drum 35 through line 38 and employed as a fuel gas for the generation of process heat or used for other purposes.

It will be apparent from the preceding discussion that the invention provides an apparatus and process in which the temperature of a reflux stream fed to a fractionating tower is increased after the reflux enters the tower and before it passes onto a reflux return tray. It will be understood that the invention is not restricted to a fractionating tower in which ammonium chloride may desublime and plug column internals, but may be applied in any fractionating tower in which the formation of any type solids is dependent on temperature. For example, it may be desirable to increase the reflux temperature in a fractionating tower to avoid the desublimation of ammonium hydrosulfide, ammonium hydrosulfite, ammonium bicarbonate and similar substances which undergo desublimation. It will also be understood that the invention is not limited to a fractionating tower in which desublimation may occur, but may be applied in any fractionating tower in which it is desirable for any reason to internally increase the temperature of the reflux fed to the tower.

We claim:

1. A method for avoiding the desublimation of a compound to form solids in a fractionating tower by increasing the temperature of a reflux stream to a value greater than the desublimation temperature of said compound after said reflux stream enters said fractionating tower and before it passes on to a reflux return tray comprising:
   (a) passing said reflux stream through an atomizer located above said reflux return tray in said fractionating tower to form a downfalling spray of liquid droplets;
   (b) collecing said downfalling droplets as heated reflux on a chimney tray located between said reflux return tray and said atomizer, said chimney tray containing chimneys that convey hot vapors rising from said reflux return tray upward through said chimney tray and wherein said chimney tray is located a sufficient distance below said atomizer to allow sufficient heat transfer from said hot vapors to said downfalling droplets so that the temperature of the heated reflux collected on said chimney tray is greater than the desublimation temperature of said compound; and
   (c) passing said heated reflux from said chimney tray onto said reflux return tray.

2. A method as defined in claim 1 wherein said compound comprises ammonium chloride.

3. A method as defined in claim 1 wherein the temperature of said heated reflux on said chimmy tray is from about 10° F. to about 40° F. greater than the desublimation temperature of said compound.

4. A method for avoiding the formation of solid ammonium chloride by desublimation in a fractionating tower which comprises:
   (a) scrubbing vapors removed overhead from said fractionating tower with water in a scrubbing zone;
   (b) passing the effluent from said scrubbing zone through a condenser to form a liquid condensate;
   (c) passing at least a portion of said liquid condensate as reflux through a spray nozzle located above a reflux return tray in said fractionating tower to form a downfalling spray of liquid droplets;
   (d) collecting said downfalling droplets as heated reflux on a chimney tray located between said reflux return tray and said spray nozzle, said chimney tray containing chimneys that convey hot vapors rising from said reflux return tray upward through said chimney tray and wherein said chimney tray is located a sufficient distance below said spray nozzle to allow sufficient heat transfer from said hot vapors to said downfalling droplets so that the temperature of said heated reflux is greater than the desublimation temperature of said ammonium chloride; and (e) passing said heated reflux from said chimney tray onto said reflux return tray.

* * * * *